United States Patent [19]
Peltier et al.

[11] 3,935,765
[45] Feb. 3, 1976

[54] AUTOMATIC CAMSHAFT LATHE

[75] Inventors: Henri Peltier, Chatillon; Michel Catrain, Bures-sur-Yvette; André Monnin, Rueil-Malmaison, all of France

[73] Assignee: Regie Nationale des Usines Renault, Boulogne-Billancourt, France

[22] Filed: May 31, 1973

[21] Appl. No.: 365,817

[30] Foreign Application Priority Data
June 9, 1972 France .............................. 72.20958

[52] U.S. Cl. ................. 82/19; 51/105 SP; 82/2.5
[51] Int. Cl.² .................................... B23B 3/28
[58] Field of Search ........... 82/19, 2.5, 9; 51/100 R, 51/105 SP

[56] References Cited
UNITED STATES PATENTS

| | | | |
|---|---|---|---|
| 1,542,803 | 6/1925 | Gordon et al. | 82/19 |
| 1,655,655 | 1/1928 | Melling | 82/19 |
| 1,916,581 | 7/1933 | O'Brien | 82/19 |
| 2,124,347 | 7/1938 | Groene et al. | 82/19 |
| 2,557,043 | 6/1951 | Wright et al. | 82/19 |
| 3,789,709 | 2/1974 | Kendall et al. | 82/9 |

*Primary Examiner*—J. M. Meister
*Assistant Examiner*—W. R. Briggs
*Attorney, Agent, or Firm*—Browne, Beveridge, DeGrandi & Kline

[57] ABSTRACT

An automatic camshaft lathe having a plurality of machining tools mounted on tool slides fed and oriented by cam-actuated mechanical transmissions and located to simultaneously machine a plurality of cam surfaces on camshafts mounted at two machining stations in the lathe. The two machining stations are arranged symmetrically relative to the longitudinal vertical centerplane of the lathe. A single shaft mounted above the respective machining stations supports and drives the feed and orienting cams for the tool slides at each machining station. A common gear train drives the shafts operating the control cams for each machining station.

13 Claims, 2 Drawing Figures

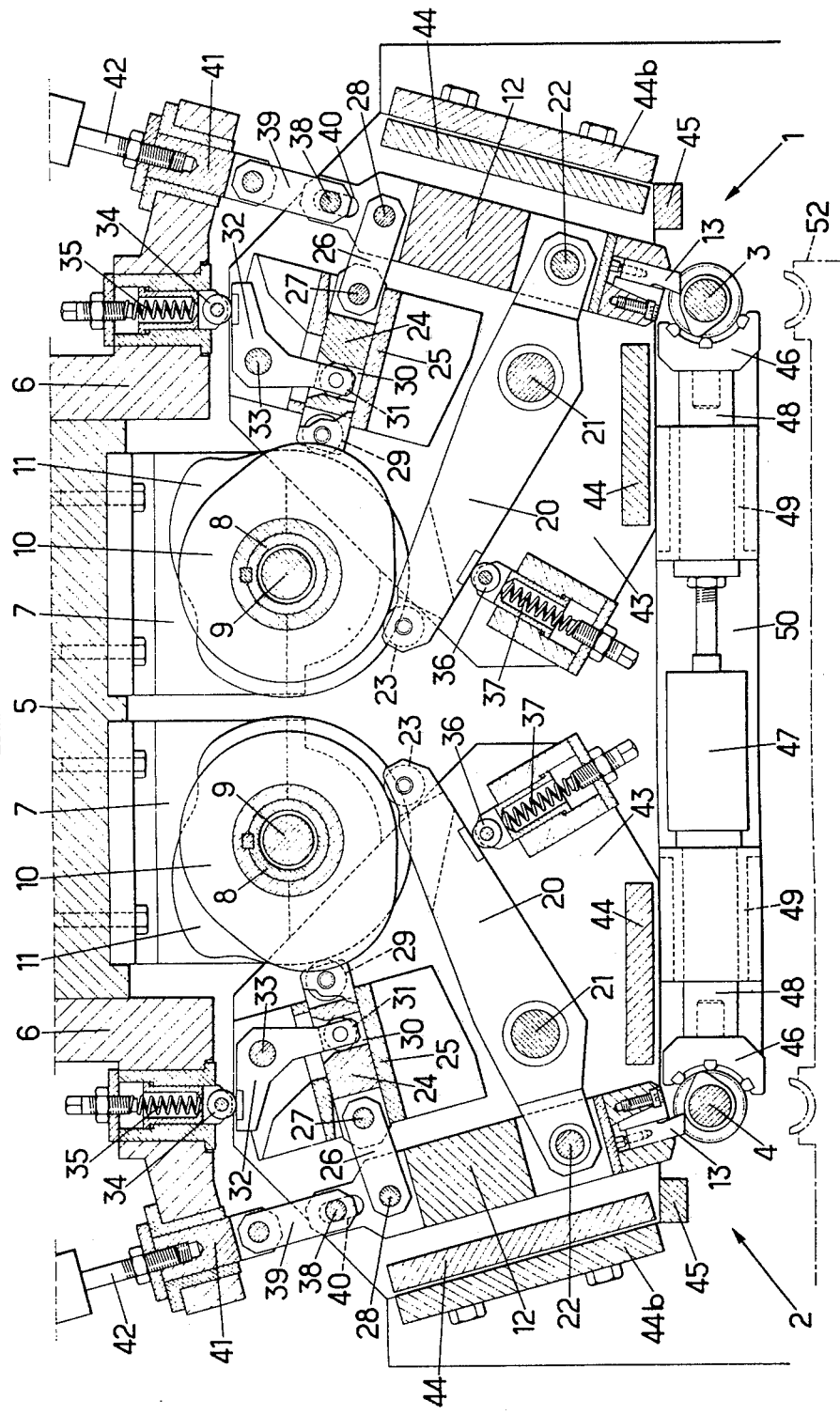

AUTOMATIC CAMSHAFT LATHE

BACKGROUND OF THE INVENTION

1. Field of the Invention

This invention relates to automatic lathes for shaping multiple cams all disposed on the same shaft, such as the lathes used for the production of camshafts of internal combustion engines.

2. Description of the Prior Art

Cam turning usually precedes a truing step and requires double guiding of the tool, which must move radially to produce the cam profile and angularly in the cutting plane to give a constant cutting angle whatever the cam profile may be, the tool axis being continuously oriented along the profile radius passing through the tool tip. These complex movements are usually produced by cams which act simultaneously on tool slide movements by wasy of a mechanical transmission comprising levers and slideways.

In some lathes of this kind the workpiece, if a camshaft, is retained conventionally between centers and the cams are machined simultaneously through the agency of a group or set of tool slides, the cams which provide axial and radial guiding of the tool slides being respectively disposed on two parallel shafts; the camshaft to be machined is in this case borne by its bearing surfaces being cradled in support members, to obviate bending of the camshaft.

The master guide cams must be disposed near the tool, to ensure that the motion is transmitted with adequate rigidity, and are usually to a multiple scale of the cams of be machined, for improved accuracy and for improved stiffness of the shafts bearing the cams, such shafts being subject to the bearing reactions of the tool slides during cutting. The resulting guide-camshafts are bulky, and their nearness to the tool restricts access to the tool slides and makes it difficult to supply and remove workpieces in automatic cycles. The restricted accessibility also hampers swarf removal, since the swarf may jam between the cams and the rollers and thus cause damage and rejects, so that it is difficult to produce long runs.

SUMMARY OF THE INVENTION

It is an object of this invention to obviate these disadvantages; the invention therefore relates to an automatic camshaft lathe which can operate continuously and automatically on long runs but which is readily adaptable to various kinds of workpiece.

The automatic camshaft lathe according to this invention is of the kind comprising multiple tools disposed on tool slides fed and oriented through the agency of a mechanical transmission and of feed and orienting cams, with cradling of workpieces retained between two centers, wherein the lathe comprises a longitudinal beam which is rigidly secured to the frame and disposed substantially above the workpiece and on which a single shaft is suspended, the feed and orienting cams being disposed in side-by-side relationship on the single shaft.

Preferably, the lathe comprises tow machining stations which are symmetrical of one another relative to a vertical plane parallel to the axis of the workpieces, the tool slides of the second machining station being driven by the same drive line similarly to the tool slides of the first machining station by way of feed and orienting cams disposed in side-by-side relationship on a shaft suspended on a longitudinal beam which is rigidly secured to the frame and symmetrical of the first beam relative to the said vertical plane.

Advantageously, the workpiece cradles are so disposed between the workpieces in the plane of their axes that bearing pressures are mutually compensated for through the agency of known bearing means.

Preferably, the lathe has provision for moving the workpiece-retaining centers longitudinally, the tool slides moving only in fixed transverse planes so that axial feeding is by movement of the workpeices.

Preferably, each tool slide is guided by means of a feed and return lever actuated by a roller running on the feed cam and by an orienting rod pivoted to a tappet actuated by a roller rolling on the orienting cams, the two cams being disposed one beside another on the single shaft. Adjustable resilient means can act on the tool slide levers and rods to ensure that the rollers apply a constant pressure to the feed and orienting cams to compensate for thrust reactions on the tools due to cutting forces.

Preferably, each shaft bearing the feed and orienting cams is a tubular shaft rotatably mounted in a multiple-bearing support system secured to the beam which is rigidly secured to the frame. A drive shaft is threaded into and secured in the tubular shaft and can be keyed and centered therein just by way of its end bearing surfaces.

Advantageously, the tool slides of a single station are connected by rodding to a common actuator providing simultaneous lift-off of the tool slides at workpiece changing and simultaneous disengagement of the tools from the workpiece.

Preferably, a space is left below each workpeice for the passage of a cross-transfer device, for supplying and removing workpieces, and for the removal of swarf in a chute.

Advantageously, the workpieces are preoriented on the transfer device, the mandrel having been before machining, secured in rotation by an indexing device which is provided at each machining station and which is controlled directly by a proximity detector triggered by the position of the feed and guide cam shaft in dependance with the lathe drive line.

BRIEF DESCRIPTION OF THE DRAWINGS

The invention will be more clearly understood from the study of an exemplary non-limitative embodiment shown in the drawings wherein:

FIG. 2 is a partial view in side elevation on line II—II of FIG. 1, showing the two symmetrical machining stations and the elements for guiding the tool slides.

DECRIPTION OF THE PREFERRED EMBODIMENT

Figure 1:
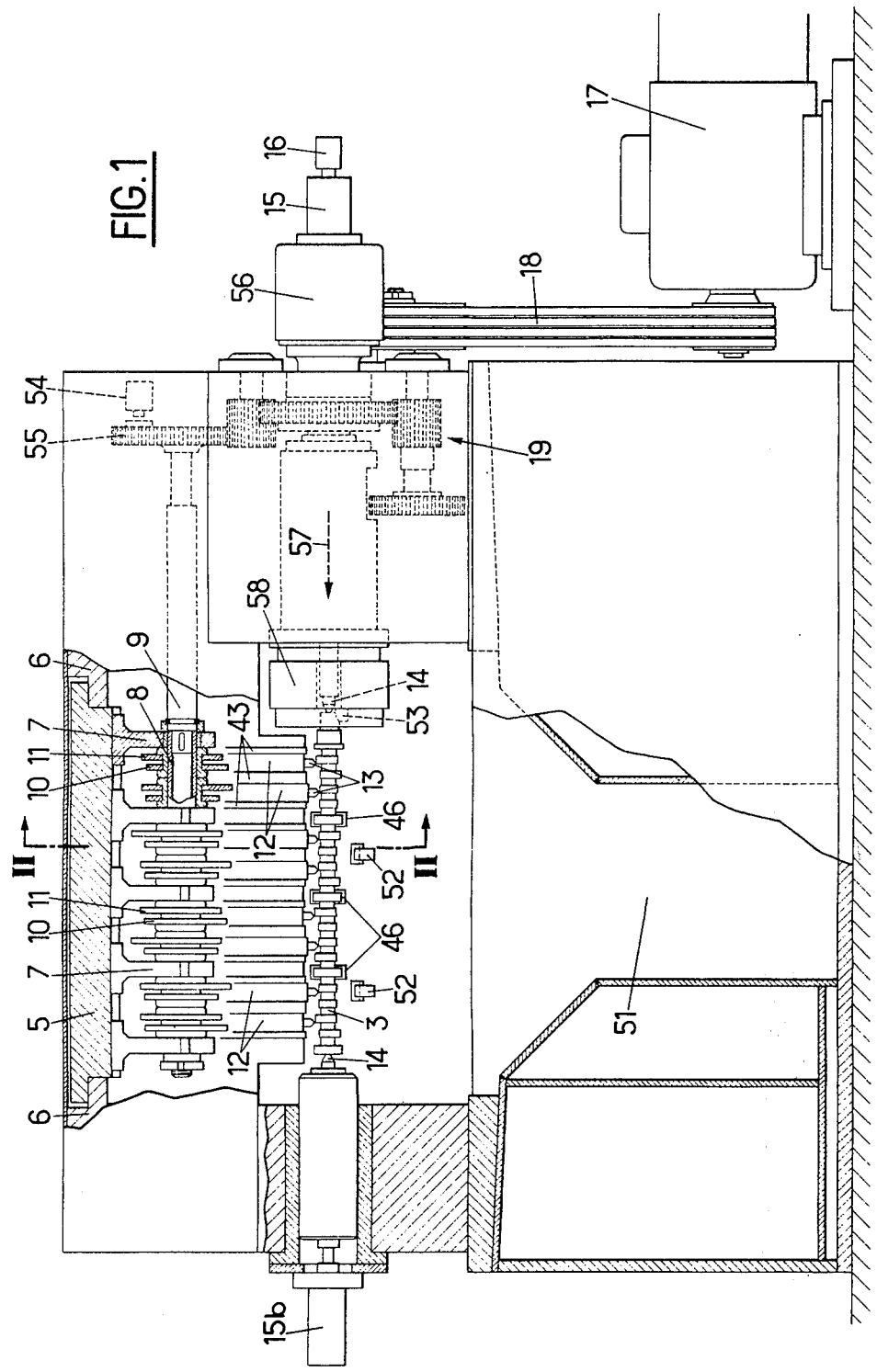
FIG. 1 is an elevation view in partial section, with parts cut away, showing one machining station of a camshaft lathe according to this invention.

As shown in the drawings, a camshaft lathe according to this invention comprises two machining stations 1, 2 which are so disposed symmetrically of a longitudinal vertical plane that two camshafts 3, 4 can be machined simultaneously. A beam 5 is rigidly secured to lathe frame 6 and includes parallel beam portions 5A, 5B disposed above the workpieces 3, 4, respectively. Alternatively, two separate beams 5A, 5B may be employed. Bearing brackets 7 are mounted on each beam portion and support a hollow shaft 8 rigidly secured to a drive shaft 9 as by a threaded coupling. Disposed on shaft 8 are feed cams 10 and guide cams 11 for controlling the guiding of tool slides 12 and tools 13 employed to machine workpieces 3, 4.

The workpieces 3, 4 are retained axially in a conventional manner between two centers 14 which pneumatic actuators 15, 15b retain in the clamping position, actuator 15 being energized via a rotating fluid coupling or joint 16. The workpieces 3, 4 are rotated by a mandrel 58 driven by gear train 19.

As can be seen in FIG. 1, a motor 17 acts via transmission belts 18 to drive the gear train 19 which is responsible for rotating the workpieces 3 and 4 and the shafts 9, 8.

The actuation of each machining station can be seen more particularly in FIG. 2. Since the two machining stations are symmetrical, only one of them will be described in detail, with identical reference numerals being employed to designate like parts at the two stations. A lever 20 pivoted around a stationary pivot 21 is connected to tool slide 12 near tool 13 by a pivot 22. At the end opposite pivot 22, lever 20 bears a roller 23 running on the peripheral cam surface of feed cam 10. Consequently, in its oscillations around pivot 21, the lever 20 controls the advance and return, or feed, of tool slide 12, and therefore of tool 13, relatively to workpiece 3 in a plane normal to the axis of the workpiece. Lever 20 is therefore associated with generation of the profile of the cams on the workpiece 3.

A tappet 24 is mounted for sliding movement between the two opposed surfaces of a stationary guide member 25 to actuate a link 26 which is connected to tappet 24 via pivot 27 and to the top part of tool slide 12 via pivot 28. At the end remote from pivot 27 tappet 24 comprises a roller 29 running on the peripheral cam surface of orienting cam 11. In its rotation, therefore, cam 11 varies the inclination or tilt of tool slide 12 within the plane normal to the axis of workpiece 3 and thus controls the inclination or tilt of tool 13 in accordance with the profile of the cam to be machined, so that the geometry of tool 13 is always oriented in accordance with the profile of the cam being machined on camshaft 3.

Tappet 24 is formed with a groove or channel 30 cooperating with a roller 31 positioned therein and rigidly secured to a bell crank lever 32 pivoted to a stationary pivot 33. A roller 34 acted on by a spring 35 so biases lever 32 that roller 29 is always biased into contact with guide cam 11 so as to follow the profile thereof. Similarly, a pressing roller 36 acts via a spring 37 om lever 20 to continuously urge roller 23 into contact with the cam surface of feed cam 10 to compensate for the thrust reaction of tool 13, such reaction tending to disengage tool slide 12 and roller 23 from cam 10.

From the above, it is seeen that the tool slide 12, which moves in a transverse vertical plane relative to the longitudinal axis of workpiece 3, has its position and inclination relatively to the workpiece continuously controlled by cams 10, 11 during the machining operation. Spindles 38 rigidly secured to the top end of tool slides 12 are connected, by way of an elongated aperture 40 in connecting rods 39, the aperture 40 enabling the rods to move when the tool slides 12 move, to a guide member 41 which is mounted for sliding movement relative to frame 6 by a lift-off actuator 42 for simultaneous withdrawal of the tools against the force of springs 35, 37 at workpiece changing and for tool adjustments and tool changing. A similar actuator-controlled lift-off arrangement is provided to simultaneously withdraw the tool slides at the other machining station.

The system embodied by a single tool slide 12 and its actuation mechanism, including the lever 20, rod 26, tappet 24 and lever 32, is disposed as a compact subassembly mounted between spaced parallel walls 43 which can be seen in FIG. 1 and which are bolted to cross members 44. The assembly is supported on the frame 6 by longitudinal bar 45 and a transverse support member 50 (visible in FIG. 2) and is bolted to frame 6 with the interposition of a plate 44b rigidly secured to one of the cross members 44. Consequently, the compact machining assemblies can readily be removed laterally, individually or in groups, for servicing or if only some of the tools are required to operate.

The workpieces 3, 4 are supported during the machining operation by cradles 46 which are engaged with the workpieces 3 and 4 by a common actuator 47 and which are disposed on spindles 48 slinding in guide runners or the like 49 which, in turn, are rigidly secured to the member 50 and act as limit devices for the spindles 48.

Referring more particulary to FIG. 1, there is a space below the workpieces 3, 4 through which swarf can drop into chutes 51. An automatic transfer device 52 for the automatic supply and removal of workpieces is mounted for movement within this space also.

The individual workpieces are therefore placed on the transfer device 52 and are preoriented in rotation. With the tool slides 12 withdrawn by the lift-off assembly 42 and with the cradles 46 withdrawn through the agency of actuator 47, the workpieces are positioned by the device 52 between the centers 14, which are then moved towards one another by the pneumatic actuators 15, 15b. The orientation of the workpieces being loaded is controlled by an indexing device 53 in the form of a key, visible in FIG. 1, rigidly secured to the main spindle and adapted to fit in a slot formed in one end of the cam shaft 3. Main spindle orientation is under the direct control of a proximity detector 54 which is triggered by the position of drive shaft 9 connected to gear wheel 55. Accurate securing of the workpieces in the proper rotative position is therefore accomplished in dependence upon the rotative position of the drive gear chain 19. As can be seen in FIG. 1, the tool slides 12 move only in a transverse vertical plane, axial feeding, i.e., relative movement of the tools 13 and the workpieces 3, 4 in a direction parallel to the longitudinal axis of the workpieces, being by a longitudinal movement of the centers 14 and of the mandrel 58, so that a toothed rack (not shown) moves the workpieces 3, 4 in the direction indicated by an arrow 57 against the bias of the hydraulic actuator 56.

In the embodiment described, half the cams on each workpiece 3, 4 are machined simultaneously, as can be seen in FIG. 1. This feature makes it possible to use wide, rigid and rugged tool slides 12 and control cams 10, 11 while simultaneously cutting down machining time. In this case, the two symmetrical machining stations of the lathe according to the invention can provide either two identical machining operations simultaneously or complete machining of all the cams of one workpiece in two consecutive overlapping operations. Changeover between machining stations can readily be provided by the transfer device. This duplication helps to simplify and improve lathe performances.

This invention therefore provides automatic camshaft lathes which are of very simple construction as the result of the symmetrical nature of the lathe, and so first costs are definitely lower than for known lathes. Also, since the tool slides, their guide elements and the master camshaft and its support system are devised as compact, readily accessible and releasable units, they can be rapidly exchanged for units which have been preset outside the lathe, with a consequent reduction in lathe down time. The control of tool slide movements by pivots and levers is simple, rugged, free from backlash and hard-wearing, as compared with conventional slideway controls and drives.

The tool slides, their guiding elements and the single shaft on which the master cams are disposed are very accessible and are out of the way of swarf, which is removed just by dropping into the chute, thus obviating the need for any manual cleaning.

The cradling of the workpieces on independent rests between two workpieces reduces lathe size and first cost. This feature enables the rests to be positioned simultaneously on the two workpieces by a single actuator. The fact that the actuator is disposed centrally is another feature improving access to the workpieces for checking their machining. Also, the fact that tool reaction forces are diverted to stops rigidly secured to the lathe frame improves accuracy by reducing bending of the workpieces being machined, thus reducing tool wear and improving product quality.

The tool slides are of much simpler construction than those of known lathes, and tool slide rigidity is improved by the axial feed movement of the workpiece, such movement being provided by this invention in a very simple manner.

This invention therefore lends to a very rugged and simple machine which is cheaper than the known machines and has the advantage thereover of being a compact machine from which swarf can be removed readily and in which a cross transfer device can supply and remove the workpieces automatically. The automatic camshaft lathe according to this invention can satisfactorily provide high output automatic machining together with very flexible adjustment and a wide range of adaptation.

While we have disclosed a preferred embodiment of our invention, we wish it understood that we do not intend to be restricted solely thereto, but rather that we do intend to include all embodiments which would be apparent to one skilled in the art and which come within the spirit and scope of our invention.

What is claimed is:

1. An automatic lathe assembly for supplying elongated workpieces at machining stations in a lathe, simultaneously machining separate surfaces at a plurality of spaced work stations along the length of said elongated workpieces supported at machining stations in said lathe, and removing said machined workpieces from said machining stations, said automatic lathe comprising at each work station a tool slide having a machining tool thereon and mounted for movement by mechanical transmission means operably connected thereto, driven tool feed and tool orienting cams for actuating said mechanical transmission means to feed and orient said tool slides and the machining tools mounted thereon, and workpiece supporting means including opposed members for mounting therebetween the elongated workpieces for rotation about their longitudinal axes at a first machining station in said lathe, said lathe further comprising longitudinally extending support beam means extending above a workpiece at said first machining station, bearing bracket means rigidly mounted on and projecting downwardly from said beam means, a first shaft supported in spaced relation below said beam means by said bearing bracket means for rotation about its longitudinal axis extending parallel to and spaced above the axis of a workpiece mounted at said first machining station, one each of said feed and said orienting cams being coaxially mounted on said first shaft for rotation therewith in side-by-side relation to one another at each said work station along the workpiece at said first machining station and substantially above said workpiece, said mechanical transmission being located substantially above said workpiece with only said tool slide and the machining tool thereon extending down to said workpiece thereby leaving below said workpiece an unobstructed space; drive means for simultaneously rotating said shaft and said workpiece about their longitudinal axes and; means for moving said workpiece supporting means longitudinally during machining of said workpieces so that axial feeding is accomplished by movement of the workpieces; and automatic cross transfer means for automatically supplying and removing workpieces positioned into said unobstructed space, said transfer means including means for positioning and removing directly said workpieces between said supporting means.

2. The lathe as defined in claim 1 wherein each said tool slide and the machining tool mounted thereon and the mechanical transmission means associated therewith comprise preassembled subassemblies each adapted to be rigidly mounted on and removed laterally from said lathe as a unit.

3. The lathe as defined in claim 1 further comprising a swarf storage container positioned below said machining station, chute means for directing swarf falling by gravity from said work stations into said swarf storage container, said chute being spaced below said work stations, said work transfer means being mounted for movement within the space between said work stations and said chute for moving a workpiece into and out of said first machining station.

4. The automatic lathe as defined in claim 1 wherein said lathe further comprises a second shaft supported in spaced relation below said beam means by said bearing bracket means for rotation about its longitudinal axis extending parallel to the axis of said first shaft, said workpiece supporting means including means for mounting a second workpiece at a second machining station for rotation about its longitudinal axis parallel to a workpiece at said first machining station, said work stations being disposed along each said machining station for simultaneously machining a plurality of separate surfaces on workpieces mounted at said first and said second machining stations, and one of said feed and said orienting cams being coaxially mounted on said second shaft for rotation therewith in side-by-side relation to one another at each said work station along the workpiece mounted at said second machining station, said drive means being operable to rotate said first and said second shafts and the workpieces mounted at said first and said second machining stations simultaneously, said first and second machining stations being located at substantially the same level whereby said mechanical tranmission is located substantially above the workpieces at each said machining station thereby leaving said unobstructed space therebelow.

5. The lathe as defined in claim 4 wherein said mechanical transmission means at each said machining station is operable to move said tool slides only in planes extending transverse to the longitudinal axis of said first and second shafts, and wherein said workpiece supporting means comprises a pair of opposed centers mounting the workpiece at each said machining station for rotation about their longitudinal axes extending parallel to the axes of said shafts, and feed means operable to move said centers parallel to the longitudinal axis of said workpiece axes to feed said workpieces axially past said machining tools at the work stations along each said machining station.

6. The lathe as defined in claim 4 wherein each said tool slide and the machining tool mounted thereon and the mechanical transmission means associated therewith comprise preassembled subassemblies each adapted to be rigidly mounted on and removed laterally from said lathe as a unit.

7. The lathe as defined in claim 4 further comprising a first actuator spaced above said tool slides along said first machining station, a second actuator spaced above said tool slides along said second machining station, withdraw coupling means operatively connecting each said tool slide along said first machining station to said first actuator and for connecting each said tool slide along said second machining station to said second actuator, said actuators being operable to simultaneously withdraw said tool slides connected thereto to facilitate removal and installation of workpieces.

8. The lathe as defined in claim 4 further comprising a swarf storage container positioned below said machining station, chute means for directing swarf falling by gravity from said work stations into said swarf storage container, said chute being spaced below said work stations, and a work transfer device mounting for movement within the space between said work stations and said chute for moving a workpiece into and out of said first machining station.

9. The lathe as defined in claim 1 wherein said mechanical transmission means for moving each said tool comprises a tool slide operably connected to a lift-off means through a guide member mounted for sliding movement relative to said frame, a feed lever mounted for pivotal movement around a stationary pivot and having one end pivotally connected to said tool slide and its other end contacting said feed cam, and tappet means mounted for sliding movement in a stationary guide member and having one end contacting said orienting cam and its other end pivotally connected to said tool slide.

10. The lathe as defined in claim 4 wherein said mechanical transmission means for moving each said tool comprises a tool slide operably connected to a lift-off means through a guide member mounted for sliding movement relative to said frame, a feed lever mounted for pivotal movement around a stationary pivot and having one end pivotally connected to said tool slide and its other end contacting said feed cam, and tappet means mounted for sliding movement in a stationary guide member and having one end contacting said orienting cam and its other end pivotally connected to said tool slide.

11. In an automatic lathe for simultaneously machining separate surfaces at a plurality of spaced work stations along the length of elongated workpieces supported at machining stations in the lathe, said lathe including at each work station a tool slide having a machining tool thereon and mounted for movement by mechanical transmission means operably connected thereto, driven tool feed and tool orienting cams for actuating the mechanical transmission means to feed and orient said tool slides and the machining tools mounted thereon, and workpiece supporting means for mounting a workpiece for rotation about its longitudinal axis at a first machining station in said lathe, the improvement comprising longitudinally extending support beams means extending above a workpiece at said first machining station, bearing bracket means mounted on and projecting downwardly from said beam means, a tubular shaft supported in spaced relation below said beam means by said bearing bracket means for rotation about its longitudinal axis extending parallel to the axis of a workpiece mounted in said first machining station, said bearing bracket providing a multiple bearing support for said tubular shaft, one each of said feed and said orienting cams being mounted on said tubular shaft for rotation therewith in coaxial side-by-side relation to one another at each said work station along the workpiece at said first machining station, drive means including a drive shaft directly connected to said tubular shaft and gear means connecting said drive shaft and said workpiece support means for simultaneously rotating said shaft and said workpiece about their longitudinal axes, said bearing bracket means, said tubular shaft and said feed and orienting cams mounted thereon being adapted to be preassembled and mounted as a unit on said lathe, indexing means for positioning a workpiece in said workpiece suport means at said first machining station, said indexing means including proximity detector means operatively connected to said first shaft means for detecting the rotative position thereof, and means for positioning a workpiece on said workpiece support means in accordance with the rotative position sensed by said proximity detector means.

12. In an automatic lathe for simultaneously machining separate surfaces at a plurality of spaced work stations along the length of elongated workpieces supported at machining stations in the lathe, said lathe including at each work station a tool slide having a machining tool thereon and mounted for movement by mechanical transmission means operably connected thereto, driven tool feed and tool orienting cams for actuating the mechanical transmission means to feed and orient said tool slides and the machining tools mounted thereon, and workpiece supporting means for mounting a workpiece for rotation about its longitudinal axis at a first machining station in said lathe, the improvement comprising longitudinally extending support beam means extending above a workpiece at said first machining station, bearing bracket means mounted on and projecting downwardly from said beam means, first and second shafts supported in parallel spaced relation below said beam means by said bearing bracket means for rotation about their longitudinal axis extending parallel to the axis of a workpiece mounted in said first machining station, one each of said feed and said orienting cams being mounted on said first shaft for rotation therewith in side-by-side relation to one another at each said work station along the workpiece at said first machining station, and drive means for simultaneously rotating said shaft and said workpiece about their longitudinal axes, said workpiece supporting means including means for mounting a second workpiece at a second machining station for rotation about its longitudinal axis parallel to a workpiece at said first machining station, said work stations being disposed along each said machining station for simultaneously machining separate surfaces on workpieces mounted at said first and said second machining stations, and one of said feed and said orienting cams being mounted on said second shaft for rotation therewith in side-by-side relation to one another at each said work station along the workpiece mounted at said second machining station, said drive means being operable to rotate said first and said second shafts and the workpieces mounted at said first and said second machining stations simultaneously, said mechanical transmission means being operable to move said tool slides only in planes extending transverse to the longitudinal axis of said first and second shafts, said workpiece supporting means including a pair of opposed centers mounting the workpiece at each said machining station for rotation about their longitudinal axes extending parallel to the axes of said shafts, and feed means operable to move said centers longitudinally of said workpiece axes to feed said workpieces axially past said machining tools at the work stations along said first and said second machining station, workpiece feeding and positioning cradle means disposed between said first and said second machining stations, and actuator means for moving said cradle means to simultaneously position a workpiece at each said machining station, said actuator means including independent stop means associated with each said machining station whereby a single actuator operation positions a workpiece at said first and said second machining stations.

13. In an automatic lathe for simultaneously machining separate surfaces at a plurality of spaced work stations along the length of elongated workpieces supported at machining stations in the lathe, said lathe including at each work station a tool slide having a machining tool thereon and mounted for movement by mechanical transmission means operably connected thereto, driven tool feed and tool orienting cams for actuating the mechanical transmission means to feed and orient said tool slides and the machining tools mounted thereon, and workpiece supporting means for mounting a workpiece for rotation about its longitudinal axis at a first machining station in said lathe, the improvement comprising longitudinally extending support beam means extending above a workpiece at said first machining station, bearing bracket means mounted on and projecting downwardly from said beam means, a first shaft supported in spaced relation below said beam means by said bearing bracket means for rotation about its longitudinal axis extending parallel to the axis of a workpiece mounted in said first machining station, one each of said feed and said orienting cams being mounted on said first shaft for rotation therewith in side-by-side relation to one another at each said work station along the workpiece at said first machining station, and drive means for simultaneously rotating said shaft and said workpiece about their longitudinal axes, said workpiece supporting means including means for mounting a second workpiece at a second machining station for rotation about its longitudinal axis parallel to a workpiece at said first machining station, said work stations being disposed along each said machining station for simultaneously machining separate surfaces on workpieces mounted at said first and said second machining stations, and one of said feed and said orienting cams being mounted on said second shaft for rotation therewith in side-by-side relation to one another at each said work station along the workpiece mounted at said second machining station, said drive means being operable to rotate said first and said second shafts and the workpieces mounted at said first and said second machining stations simultaneously, said first and second shafts being tubular shafts, said tool feed cam and said tool orienting cam at each said work station along said first and second machining stations being mounted on said first and second shafts in coaxial side-by-side relation, said bearing bracket means providing a multiple bearing support for said first and second shafts, said bearing bracket means, said tubular shaft, and said feed and orienting cams mounted thereon and associated with the respective machining stations being adapted to be preassembled and mounted as a unit in said lathe, said drive means including a pair of drive shafts one directly connected to said first and second tubular shafts by threaded couplings, gear means operatively connecting said drive shafts and said workpiece support means for simultaneous rotation with said first and second tubular shafts, and indexing means for positioning workpieces in said workpiece support means at said first and second machining station, said indexing means including proximity detector means operatively connected to one of said shafts for detecting the rotative position thereof.

* * * * *